(12) United States Patent
Fuselier et al.

(10) Patent No.: US 6,920,495 B1
(45) Date of Patent: Jul. 19, 2005

(54) METHOD AND SYSTEM FOR FACILITATING WEB-BASED INFORMATION EXCHANGE VIA A CENTRALIZED WEB STRUCTURE FOR MANAGING PROJECTS AND FUNDING REQUESTS

(75) Inventors: Christopher S. Fuselier, Farmington, CT (US); Guillermo Wille, Avon, CT (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 09/652,909

(22) Filed: Aug. 31, 2000

Related U.S. Application Data
(60) Provisional application No. 60/173,844, filed on Dec. 30, 1999.

(51) Int. Cl.[7] .................. G06F 15/173; G06F 15/16
(52) U.S. Cl. .................. 709/224; 709/203; 709/217; 709/218; 709/219; 709/223
(58) Field of Search .................. 709/218, 223, 709/217, 219, 224, 229; 705/7, 9, 1

(56) References Cited

U.S. PATENT DOCUMENTS

| | | | | |
|---|---|---|---|---|
| 5,862,330 A | * | 1/1999 | Anupam et al. | 709/204 |
| 5,918,009 A | * | 6/1999 | Gehani et al. | 713/201 |
| 5,958,016 A | * | 9/1999 | Chang et al. | 709/229 |
| 5,991,796 A | * | 11/1999 | Anupam et al. | 709/206 |
| 6,073,135 A | * | 6/2000 | Broder et al. | 707/100 |
| 6,202,156 B1 | * | 3/2001 | Kalajan | 709/229 |
| 6,209,036 B1 | * | 3/2001 | Aldred et al. | 709/229 |
| 6,230,185 B1 | * | 5/2001 | Salas et al. | 709/219 |
| 6,272,472 B1 | * | 8/2001 | Danneels et al. | 705/27 |
| 6,308,164 B1 | * | 10/2001 | Nummelin et al. | 705/9 |
| 6,341,310 B1 | * | 1/2002 | Leshem et al. | 709/223 |
| 6,374,274 B1 | * | 4/2002 | Myers et al. | 715/523 |
| 6,687,677 B1 | * | 2/2004 | Barnard et al. | 705/7 |

\* cited by examiner

*Primary Examiner*—Rupal Dharia
*Assistant Examiner*—Quang Nguyen
(74) *Attorney, Agent, or Firm*—Armstrong Teasdale LLP

(57) ABSTRACT

A method for facilitating Web-based information exchange includes providing a centralized Web structure for the Web-based information of an organization. The Web-based information includes Web pages and interactive Web-based applications. The Web structure includes multiple Web sites linked to at least one common site to which the Web-based information generated by the organization is linked, directly or indirectly. Thus the Web structure provides a user with single point of entry access to the Web-based information of the organization.

33 Claims, 21 Drawing Sheets

520

SESSION-II PROGRAM FUNDING REQUEST---2000 PROGRAMS

PROGRAM DESCRIPTION →  522

| NAME | JASON (FIRST NAME) WASSERMAN (LAST NAME) | PRIORITY CODE | 1 0 G (BUSINESS) (INDSYS) ( ) |
|---|---|---|---|
| DIAL COMM | 8 * 756 - 7286 | BUSINESS | SHARED |
| MGPP REFERENCE | WEBCITY | FUNCTION | TECH |
| PROJECT NAME | SOURCING & TECHNOLOGY WEBCITY | TEAM | |
| CHAMPION | ERIC REED (FIRST NAME) (LAST NAME) | TYPE | GROW PROD |
| OBJECTIVES | DRIVE ENGINEERING PRODUCTIVITY BY PROVIDING WEB-BASED TOOLS AND APPLICATIONS THAT ENABLE VIRTUAL CO-LOCATION FOR ENGINEERING DEVELOPMENT AND COLLABORATION. | | |
| CTQ'S/REQMTS | ENABLE VIRTUAL CO-LOCATION VIA WEB-BASED ORG.: PROVIDE GLOBAL ACCESS DATA IN REAL OR CLOSE TO REAL TIME PROVIDE GLOBAL WEB-BASED TOOLS (E. PROJECT TRACKING, ACCESS TO OTHER WEB-BASED TOOLS LIKE NEWTON2000. SUP | | |
| POSITIONING | ACQUIRE APPLICATIONS FROM WITHIN THE ORGANIZATION OR GE FOR FREE FIRST LOOK TO PURCHASE/SOURCE WHERE WE CANNOT ACQUIRE IT FOR FREE AND UTILIZE THE ODCS TO DEVELOP THE APPLICATIONS AND/OR SITES WHEN THERE IS NO OTHER | | |
| REPLACES | NA | | |
| MFG. STRATEGY | | | |

| TIMING | START | DP1 | 10 / 1998 |
|---|---|---|---|
| | LAUNCH | DP3 | 06 / 2000 |
| | COMPLETE | DP4 | 12 / 2000 |
| | | | (MM)(YYYY) |

| ($000 STARTING AFTER DP3) | | ($000 STARTING AT DP1) | | | | |
|---|---|---|---|---|---|---|
| MOS | BENEFIT | PGM MOS | INC | EXP | INV | CASH FLOW |
| 1-12 | 0 | 1-12 | 0 | 398 | 1250 | -1648 |
| 13-24 | 0 | 13-24 | 0 | 0 | 0 | 0 |
| | ($000) | 25-36 | 0 | 0 | 0 | 0 |
| | | 37-48 | 0 | 0 | 0 | 0 |
| | | 49-60 | 0 | 0 | 0 | 0 |
| | | | ($000) | ($000) | ($000) | ($000) |

FIG. 6

PROGRAM COST 524

| FUNCTION | PRE 2000 | | 2000 | | | | | POST 2000 | | TOTAL PRO | |
|---|---|---|---|---|---|---|---|---|---|---|---|
| | TOTAL EXPENSE | INVEST | EXPENSE | | | | INVEST | TOTAL EXPENSE | INVEST | TOTAL EXPENSE | |
| | | | LABOR | LABOR $ | OTHER | TOTAL | | | | | |
| COMMERCIAL | 0 | 0 | 0 | 0 | 0 | 0 | 0 | 0 | 0 | 0 | |
| TECHNOLOGY | 50 | 250 | 3.1 | 263.5 | 0 | 263.5 | | 0 | 0 | 313.5 | |
| MANUFACTURING | 0 | 0 | 0 | 0 | 0 | 0 | 0 | 0 | 0 | 0 | |
| INFO. MGMT. | 0 | 0 | 0 | 85 | 0 | 85 | 0 | 0 | 0 | 85 | |
| OTHER (DESCRIBE) | 0 | 0 | 0 | 0 | 0 | 0 | 0 | 0 | 0 | 0 | |
| TOTAL | 50 ($000) | 250 ($000) | 4.1 (MYR) | 348.5 ($000) | 0 ($000) | 348.5 ($000) | 1000 ($000) | 0 ($000) | 0 ($000) | 398.5 ($000) | |

PROGRAM BENEFITS 526

| CATEGORY | 2000 | | 2001 | | 2002 | |
|---|---|---|---|---|---|---|
| | SALES | BEN | SALES | BEN | SALES | BEN |
| TOTAL SALES/CM | 0 | 0 | 0 | 0 | 0 | 0 |
| GROWTH SATES/CM | 0 | 0 | 0 | 0 | 0 | 0 |
| MATERIAL COST OUT/CM | | 0 | | 0 | | 0 |
| LABOR COST OUT**/CM | | 0 | | 0 | | 0 |
| OTH VAR. COST OUT/CM | | 0 | | 0 | | 0 |
| BASE COST OUT**/OM | | 0 | | 0 | | 0 |
| TOTAL | 0 ($000) | 0 ($000) | 0 ($000) | 0 ($000) | 0 ($000) | 0 ($000) |

FIG. 7

| MEMO**: HEADS OUT (RELATES TO COST OUT) | HOURLY (X.X) | 0 | | 0 | | 0 |
|---|---|---|---|---|---|---|
| | SALARY (X.X) | 0 | | 0 | | 0 |

(BENEFITS $000 START AFTER LAUNCH)    (NET PRESENT VALUE $000)    (INTERNAL RATE OF RETURN)

| BENEFIT RATIO | NPV | IRR |
|---|---|---|
| 0 | $-1445.6 | NUM% |

(AT 14% APR, $000)

[NEW] [REFRESH] [SAVE CHANGES] [REPORT] [PRIORITIZE]

NOTE: SHADED CELLS ARE CALCULATED & CANNOT BE MODIFIED.
      BLACK CELLS ARE NOT APPLICABLE.

SESSION - II PROGRAM FUNDING REQUESTS - SEARCH

SELECT SEARCH CRITERIA    538      538

NAME [     ]     [     ]
      FIRST         LAST

PROJECT NAME [         ] — 538

BUSINESS [ALL    ▢]
    FUNCTION [ALL   ▢]
        TYPE [ALL ▢]
⊙ AND ○ OR

[SEARCH]

HELP: HOW TO SPECIFY SEARCH CRITERIA

SESSION - II PROGRAM FUNDING REQUESTS - PRIORITIZATION

SEARCH RESULTS

542

| PROJECT NAME | BUSINESS | FUNCTION | TYPE | PROGRAM COST 2000 | | PROGRAM BENEFITS 2000 (CURR YEAR) | | | BENEFITS 2002 (2 YRS LATER) | | |
|---|---|---|---|---|---|---|---|---|---|---|---|
| | | | | EXP. | INV. | GROWTH SALES | GROWTH CM | COST OUT | GROWTH SALES | CM | COST OUT |
| OMI PROGRAMS | COMPONENTS | TECH | GROW PROD | 700 | 1000 | 0 | 0 | 0 | 0 | 0 | 0 |
| TEY-ROCB | COMPONENTS | TECH | GROW PROD | 986 | 820 | 0 | 0 | 0 | 5598 | 2799 | 0 |
| THERMAL-MAGNETIC SPECTRA E/F | COMPONENTS | TECH | COST OUT | 333.5 | 405 | 625 | 118 | 810 | 1326 | 249 | 1718 |
| GENERATOR PANEL TEMPORARY POWER | COMPONENTS | TECH | GROW PROD | 410 | 160 | 224 | 112 | 0 | 1346 | 673 | 0 |
| TEY,65KA RATED | COMPONENTS | TECH | GROW PROD | 673.5 | 480 | 0 | 0 | 0 | 4825 | 1690 | 185 |
| COMPONENTS PRO-E CONVERSION | COMPONENTS | TECH | GROW NON-PRD | 210 | 50 | 0 | 0 | 0 | 0 | 0 | 0 |
| NONE | COMPONENTS | TECH | GROW PROD | 0 | 0 | 0 | 0 | 0 | 0 | 0 | 0 |
| NONE | COMPONENTS | TECH | GROW PROD | 0 | 0 | 0 | 0 | 0 | 0 | 0 | 0 |
| NONE | COMPONENTS | TECH | GROW PROD | 0 | 0 | 0 | 0 | 0 | 0 | 0 | 0 |
| NONE | COMPONENTS | TECH | GROW PROD | 0 | 0 | 0 | 0 | 0 | 0 | 0 | 0 |
| LIGHTING PANEL MOD-SQUAD | COMPONENTS | TECH | GROW PROD | 758 | 850 | 0 | 250 | 50 | 0 | 3000 | 250 |
| NONE | COMPONENTS | TECH | GROW PROD | 0 | 0 | 0 | 0 | 0 | 0 | 0 | 0 |
| NONE | COMPONENTS | TECH | GROW PROD | 0 | 0 | 0 | 0 | 0 | 0 | 0 | 0 |
| LOW COST LOAD CENTER AND CIRCUIT BREAKER | COMPONENTS | TECH | GROW PROD | 1420 | 1460 | 0 | 0 | 0 | 10000 | 2000 | 0 |
| MERCHANDISABLE PHASE II | COMPONENTS | TECH | GROW PROD | 799.5 | 336 | 3815 | 1793 | 0 | 4387 | 2062 | 0 |
| FUJI IEC MANUAL MOTOR STARTER, INTEGRATED STARTER AND PANEL BUS | COMPONENTS | TECH | GROW PROD | 370 | 0 | 1100 | 550 | 0 | 1690 | 760 | 0 |
| 3-POLE DP CONTACTOR REDESIGN /MEXICO MANUFACTURING (RESTRUCTURI | COMPONENTS | TECH | GROW PROD | 1050 | 1764 | 2058 | 139 | 455 | 10454 | 1929 | 1945 |

| Project | Function | Category | Type | | | | | | | |
|---|---|---|---|---|---|---|---|---|---|---|
| IMARK EXTRANET/WEB MARKETING | COMPONENTS | E-COMMERCE | GROW NON-PRO | 68.5 | 35 | 100 | 50 | 0 | 0 | 0 | 0 |
| NPI WEB ROLLOUT | COMPONENTS | E-COMMERCE | GROW NON-PRO | 44 | 0 | 0 | 0 | 0 | 0 | 0 | 0 |
| OEM PANELBUILDER EXTRANET-PART MKTG PROGRAM | COMPONENTS | E-COMMERCE | GROW NON-PRO | 20 | 19 | 200 | 100 | 0 | 0 | 0 | 0 |
| GES CONTROL CENTRAL MODULE | COMPONENTS | E-COMMERCE | GROW NON-PRO | 30 | 24 | 200 | 100 | 0 | 0 | 0 | 0 |
| EMPLOYEE PURCHASE PLAN | COMPONENTS | E-COMMERCE | GROW NON-PRO | 34 | 0 | 100 | 50 | 0 | 0 | 0 | 0 |
| DUAL-LINE DIRECT-RESI/CONTROLS | COMPONENTS | E-COMMERCE | GROW NON-PRO | 127 | 214 | 0 | 0 | 0 | 0 | 0 | 0 |
| MAPICS FOR MEXICO PLANTS (SATILLO, GEIMM) | COMPONENTS | IM | COST OUT | 770 | 1650 | 0 | 0 | 0 | 0 | 0 | 0 |
| PRODUCT INFORMATION DATA BASE | COMPONENTS | IM | GROW NON-PRO | 234.5 | 0 | 0 | 0 | 0 | 0 | 0 | 0 |
| CUSTOMER TRANSACTION QUALITY | COMPONENTS | SIX SIGMA | GROW NON-PRO | 192.5 | 0 | 0 | 0 | 150 | 0 | 0 | 0 |
| COMPONENTS TRANSACTION QUALITY -TO BE REMOVED | COMPONENTS | SIX SIGMA | GROW NON-PRO | 0 | 0 | 0 | 0 | 0 | 0 | 0 | 0 |

[ NEW PROJECT ]  [ NEW SEARCH ]  [ PRIORITIZE ]

SESSION-II SUMMARY REPORT SEARCH SCREEN

SELECT SEARCH CRITERIA

GRADE [ ALL ] ⟵ 562
FUNCTION [ ALL ]
BUSINESS [ ALL ]

☐ VIEW CARRYOVER PROJECTS

564 ⟶ [ BY FUNCTION ]  [ BY BUSINESS ] ⟵ 566

SESSION-II SUMMARY REPORT

GR

| FUNCTION | BUSINESS | PROGRAM COST 2000 | | PROGRAM BENEFITS 2000 | | | | | | |
|---|---|---|---|---|---|---|---|---|---|---|
| | | EXP. | INV. | GROWTH SALES | GROWTH CM | MATERIAL VCP | LABOR VCP | OTHER VCP | BCP | TOTAL COST OUT |
| TECH | AFFILIATES | 201 | 0 | 0 | 0 | 0 | 0 | 0 | 0 | 0 |
| | CM&G | 5749 | 7240 | 16649 | 4290 | 674 | 1779 | 12 | -434 | 2031 |
| | COMPONENTS | 4525 | 7160 | 7682 | 2769 | 650 | 300 | -37 | 0 | 913 |
| | METERS | 1055 | 1100 | 11805 | 4805 | 58 | 0 | 30 | 0 | 88 |
| | PEB | 2001 | 1581 | 6300 | 1260 | 1587 | 85 | 0 | 500 | 2172 |
| | POWER CONTROLS | 11211 | 16893 | 15018 | 10094 | 4837 | 2798 | 111 | 0 | 7746 |
| | POWER MANAGEMENT | 2078 | 725 | 4160 | 2896 | 0 | 0 | 0 | 0 | 0 |
| | SOLUTIONS-DRIVES & CONTROLS | 8669 | 5860 | 22436 | 11267 | 1520 | 0 | 0 | 0 | 1520 |
| | SOLUTIONS-ENGINEERING SERVICES | 3999 | 937 | 13010 | 4963 | 0 | 0 | 50 | 0 | 50 |
| | SOLUTIONS-INDUSTRIAL MOTORS | 2618 | 4128 | 3122 | 1124 | 0 | 0 | 0 | 0 | 0 |
| | SHARED | 13055 | 16123 | 12650 | 4610 | 606 | 1931 | 0 | 0 | 2537 |
| TOTAL | | 55159 | 61747 | 112832 | 48078 | 9932 | 6893 | 166 | 66 | 17057 |
| GRAND TOTAL | | 55159 | 61747 | 112832 | 48078 | 9932 | 6893 | 166 | 66 | 17057 |

NEW SEARCH

FIG. 13

CPTS PERSONAL PAGE          610

|  TODAY | ERIC REED  634   634 | | | 622 |
|---|---|---|---|---|
| 10/20/99 | PERSONAL ORGANIZER SITE LINKS<br>MAIN MENU  TODAY    TASKS    ISSUES    BOOKMARKS  SUBSCRIPTIONS<br>SEARCH   PROJECTS  JOURNAL   MESSAGES  MEETINGS    CALENDAR<br>      634       634            634                   634 | | | |
| PAGE OPTIONS: | ☐ SEND A MESSAGE  ☐ ADD A TASK  ☐ ADD A MEETING  EDIT YOUR PROFILE | | | |

 —640
INBOX - NEW UNREAD MESSAGES                                    624

| FROM: | SUBJECT | DATE SENT |
|---|---|---|
| TRISH.BRUDZ@INDSYS.GE.COM | CPTS BETA USER FEEDBACK SESSIONS | 10/19/1999 |

MEETINGS TODAY o NO MEETINGS TODAY                                  626

☒ PERSONAL TASKS (DUE TODAY OR PAST DUE)                628

| STATUS | ✓ | DUE DATE | PRIOR | HRS | DESCRIPTION | REF. |
|---|---|---|---|---|---|---|

PROJECT TASKS (DUE TODAY OR PAST DUE)                   630

| STATUS | PROJ ID | DUE DATE | PRIOR | # DAYS | DESCRIPTION |
|---|---|---|---|---|---|
| ○ PAST DUE 5 WKS | 239 | 9/17/1999 | | | POSTING HIERARCHY/PERMISSIONS FOR ALL OF SOURCING & TECHNOLOGY TO SUBMIT TO GREGG EVRARD |

 DAILY JOURNAL (TODAY=10/20/1999)

VIEW OR PRINT YOU COMPLETE JOURNAL | [TOP OF PAGE]
INSERT NEW ENTRIES ON THE TOP OF EXISTING TEXT TO CREATE A RUNNING LIST.

```
9/8/99                                                    632
RANDY WALKER FORWARDED THE LIVELINK QUOTE. $192K FOR SITE LICENSE
(COVERS 1600 PEOPLE WITH PERMISSION TO POST-MAINTENANCE FEES ARE
$34K/YEAR FOR EACH OF NEXT TWO YEARS). AWAITING CALL-BACK FROM
SUZANNE ALLEN AT OPENTEXT (860-203-7437) CONCERNING "READ-ONLY"
USER BASE.  PLAN TO USE OPENTEXT QUOTE AS PLACEHOLDER FOR SESSION
2: MAY DECIDE LATER TO HOST ON WINDCHILL INSTEAD IF LICENSE ISSUES
RESOLVED.
```

[ SAVE CHANGES ]

CPTS PERSONAL PAGE

622

| TASKS | ERIC REED | |
|---|---|---|
| 10/20/99 | PERSONAL ORGANIZER SITE LINKS<br>MAIN MENU  TODAY     TASKS    ISSUES    BOOKMARKS   SUBSCRIPTIONS<br>SEARCH    PROJECTS  JOURNAL  MESSAGES  MEETINGS    CALENDAR | |
| | PAGE OPTIONS<br>☐ CREATE A TASK  ☐ VIEW YOUR TASK LIST  ☐ LIST TASKS YOU ASSIGNED<br>☐ LIST COMPLETED TASKS | |
| ADD A PERSONAL TASK ITEM HERE:<br>PRIORITY (1=HIGH)  DUE DATE:  DESCRIPTION:  [SUBMIT] | | |

651

TASKS ASSIGNED TO YOU (STATUS=OPEN) [TOP OF PAGE]

| ID# | STATUS | PRIORITY | DUE | DESCRIPTION | ASSIGNED BY | REFERENCE |
|---|---|---|---|---|---|---|

TASKS ASSIGNED BY YOU [TOP OF PAGE]

| | STATUS | TASK DESCRIPTION | ASSIGNED TO | DUE DATE | EST. DAYS | REFERENCE | |
|---|---|---|---|---|---|---|---|
| ◯ | PAST DUE 3 WKS | MAKE COPIES OF WEBCITY WEB PAGES PAGES FOR JOHN BEULICK | | 10/1/1999 | 2 | PERSONAL | DELETE |
| ✓ | COMPLETE | DISABLE CPTS PRIOR TO 14-SEP-1999 CEC MEETING BASED ON ANNE WITKAVITCH'S TIME BLOCK. | TRISH BRUDZ | 9/13/1999 | 1 | PERSONAL | DELETE |
| ✓ | COMPLETE | DESIGN & POST A DESCRIPTION PAGE FOR THE CPTS SINCE IT BE DISABLED DURING THE CEC PRESENTATION. | ALAN ARVIDSON | 9/13/1999 | 1 | JOB JAR | |
| ✓ | COMPLETE | RUN THROUGH THE CPTS & GEAE TOOL W/ERIC REED | CHRIS FUSELIER | 9/20/1999 | 1 | PERSONAL | DELETE |

CPTS PERSONAL PAGE

| ISSUES | PERSONAL ORGANIZER SITE LINKS | | | | | |
|---|---|---|---|---|---|---|
| | MAIN MENU | TODAY | TASKS | ISSUES | BOOKMARKS | SUBSCRIPTIONS |
| | SEARCH | PROJECTS | JOURNAL | MESSAGES | MEETINGS | CALENDAR |
| | ERIC REED | | | | | |
| PAGE OPTIONS: | ☐ LIST ISSUES ASSIGNED TO YOU  ☐ LIST ISSUES YOU SUBMITTED  ☐ ADD AN ISSUE | | | | | |

PROJECT & ISSUE LOG ITEMS ASSIGNED TO YOU

| ISSUE ID (CLICK TO OPEN) | ISSUE DESCRIPTION | PROJECT ASSOCIATED WITH | DUE DATE |
|---|---|---|---|
| 580 | WEBCITY SECURITY | WEB CITY - DPO | 09/30/1999 |

STATUS OF ISSUES ASSIGNED BY YOU

[TOP OF PAGE]

| ISSUE ID (CLICK TO OPEN) | STATUS | DATE SUBMITTED | ISSUE DESCRIPTION | ASSIGNED TO: | DUE DATE | STATUS REPORT |
|---|---|---|---|---|---|---|
| 580 | OPEN | 08/26/1999 | WEBCITY SECURITY | ERIC.REED@INDSYS.GE.COM | 09/30/1999 | MET W/ BRUCE LAUBE OVER THE TELEPHONE 27-AUG- |
| 581 | CLOSED | 08/26/1999 | GARY REINER VISIT PREP FOR CHRIS F.'S CONFERENCE ROOM | ERIC.REED@INDSYS.GE.COM | 09/08/1999 | PHIL MANDRY/AMY DAWSON ORDERED PLASMA DISPLAY. |
| 582 | CLOSED | 08/26/1999 | GEAE TOOL PERMISSION FORMS | ERIC.REED@INDSYS.GE.COM | 08/27/1999 | |
| 599 | CLOSED | 09/08/1999 | CPTS FOR CEC | TRISH.BRUCE@INDSYS.GE.COM | 09/13/1999 | |

| MILESTONES & TASKS | PROJECT = WEBCITY DPO<br>OWNER = ERIC REED |
|---|---|
| | PROJECT TRACKER ITEMS<br>MAINMENU  SUMMARY (4BLOCK) BENEFITS/FUNDING STAFFING<br>            MILESTONES/TASKS ISSUES         LINKS/FILECABINET |
| PAGE OPTIONS: | ☐ ADD NEW MILESTONE  ☐ ADD NEW TASK |

HIGH LEVEL - PROJECT START AND END DATES

| START DATE (MM/DD/YYYY) | END DATE: (MM/DD/YYYY) | DURATION-CALCULATED | |
|---|---|---|---|
| 08/23/1999 | 09/17/1999 | 4 WEEKS | |

MILESTONES  ——  ☐ ADD NEW MILESTONES

| DUE DATE | STATUS | MILESTONE DESCRIPTION (SELECT TO EDIT) | OWNER |
|---|---|---|---|
| 10/1/1999 | ☑ COMPLETE | DPO | ERIC.REED@IMSYS.GE.COM |

TASKS

☐ ADD NEW TASKS   VIEW GANT CHART   (TOP OF PAGE)

| | STATUS | TASK DESCRIPTION | OWNER | DUE DATE | DURATION | START DATE | COMMENTS ON STATUS |
|---|---|---|---|---|---|---|---|
| EDIT | ☑ COMPLETE | DISCUSS SESSION 2 SUBMITTAL W/GUILLERMO | ERIC.REED@IMSYS.GE.COM | 9/10/1999 | 1 DAYS | 9/11/1999 | |
| EDIT | ☑ COMPLETE | SESSION 2 FUNDING REVIEW WITH WEBCITY TEAM | ERIC.REED@IMSYS.GE.COM | 9/14/1999 | 1 DAYS | 9/15/1999 | 09/08/1999: CURRENTLY |
| EDIT | ☑ COMPLETE | GO THROUGH GEAE WEB-BASED PROJECT TOOL WITH ZONING BOARD VIA NETMEETING | ERIC.REED@IMSYS.GE.COM | 9/17/1999 | 1 DAYS | 9/18/1999 | 09/08/1999: I HAVE THE |
| EDIT | ☑ COMPLETE | POSTING HIERARCHY/PERMISSIONS FOR ALL OF SOURCING & TECHNOLOGY TO SUBMIT TO GREGG EVRARD | ERIC.REED@IMSYS.GE.COM | 9/17/1999 | 1 WKS | 9/10/1999 | REQUEST WENT OUT TO |
| EDIT | ☑ COMPLETE | PREPARE DPO PITCH | ERIC.REED@IMSYS.GE.COM | 9/28/1999 | 4 DAYS | 9/24/1999 | |
| EDIT | ☑ COMPLETE | MILESTONE: DPO DECISION POINT 0 (DPO) MEETING | ERIC.REED@IMSYS.GE.COM | 10/1/1999 | | 10/1/1999 | SCHEDULED W/CHRIS |

| SUMMARY | PROJECT=WEBCITY DPO<br>OWNER=ERIC REED |
|---|---|
| | PROJECT TRACKER ITEMS<br>MAINMENU SUMMARY (4BLOCK) BENEFITS/FUNDING STAFFING<br>        MILESTONES/TASKS ISSUES    LINKS/FILE CABINET |

PROJECT INFORMATION

PROJECT ID: 239 (CLICK TO EDIT INFO)
PROJECT NAME: WEBCITY DPO
OWNER: ERIC REED
DESCRIPTION: PREPARATION FOR THE WEBCITY DPO
PRODUCT LINE: WEBCITY GLOBAL DEVELOPMENT
TEAM: WEBCITY CORE TEAM

PROJECT SCHEDULE

STATUS: PAST DUE - 5 WEEKS
SCHEDULE:
START DATE: END DATE: DURATION:
08/23/1999 09/17/1999 4 WEEKS
MILESTONES:

| DUE DATE | | MILESTONE DESCRIPTION |
|---|---|---|
| 10/1/1999 | ✓ | DPO |

BENEFITS & BUDGET

TOTAL BUDGET: $
TOTAL BENEFITS: $
NET BENEFITS: $(RATIO)
QUALITY BENEFITS: DELTA RMA:
COMMENTS:
PROGRAM FUNDING BUDGET:
    TOTAL BUDGET  1999 BUDGET  1999ACT
HEADCOUNT 5
EXPENSES: $      $      $
INVESTMENT: $
TOTAL: $
SOURCE OF BUDGET:

ISSUE/RISKS

SUMMARY

| SCHEDULE | BUDGET | QUALITY | STAFF | BENEFITS |
|---|---|---|---|---|
| LOW | LOW | <NONE> | LOW | MEDIUM |

HIGH RISK ITEMS (>=16)

| ID | RISK | DESCRIPTION | STATUS (DUE) |
|---|---|---|---|
| 599 | ☐ | CPTS FOR CEC | CLOSED09/13/1999 |

| BENEFITS & BUDGET | PROJECT=WEBCITY DPO<br>OWNER=ERIC REED |
|---|---|
| | PROJECT TRACKER ITEMS<br>MAIN MENU  SUMMARY (4BLOCK)  BENEFITS/FUNDING  STAFFING<br>                MILESTONES/TASKS  ISSUES           LINKS/FILECABINET |

BUDGET:

| | | | |
|---|---|---|---|
| PLANNED EXPENSES: | SALARY $ [          ] (SALARY & BENEFITS)<br>OTHER $ [          ] | | |
| | TOTAL EXPENSE $ | | |
| PLANNED INVESTMENT: | $ [          ] | | |
| TOTAL BUDGET | $ | | |
| SOURCE OF BUDGET: | | | |
| | | | |

| | | 1999 | HEADCOUNT | $COMPENSATION | $OTHER EXP | $TOTAL EXP |
|---|---|---|---|---|---|---|
| ACTUAL EXPENSES: | | ACT | [    ] | $[     ] | $[     ] | $ |
| | | PLAN | [    ] | | | $[    ] |
| | | FRCST | | | | $[    ] |

FINANCIAL BENEFITS:

GROWTH:           COST OUT:          QUALITY:               SALES LOSS AVOIDANCE:
$ [        ] +  $ [        ] +  $ [        ] +      $ [        ]

TOTAL BENEFITS= $              RMA REDUCTION:  [        ]

NET BENEFITS:

[$][RATIO:]

[ SAVE CHANGES ]

| ISSUES & RISKS | PROJECT=WEBCITY DPO<br>OWNER=ERIC REED |
|---|---|
| | PROJECT TRACKER ITEMS<br>MAIN MENU  SUMMARY (4BLOCK)  BENEFITS/FUNDING  STAFFING<br>MILESTONES/TASKS  ISSUES  LINKS/FILE CABINET |
| PAGE OPTIONS: | ☐ ADD A NEW ISSUE |

RISK SUMMARY

| SCHEDULE | BUDGET | STAFF | BENEFITS | QUALITY |
|---|---|---|---|---|
| LOW ☐ | LOW ☐ | LOW ☐ | MEDIUM ☐ | <NONE> ☐ |

| SAVE CHANGES TO RISK SUMMARY |
|---|

OPEN ISSUES | [TOP OF PAGE]

| ID | DESCRIPTION | ASSIGNED TO | DUE | SCORE | COMPLETE |
|---|---|---|---|---|---|

CLOSED ISSUES | [TOP OF PAGE]

| ID | DESCRIPTION | ASSIGNED TO | DUE | SCORE | COMPLETE |
|---|---|---|---|---|---|
| 599 | CPTS FOR CEC | TRISH BRUDZ | 09/13/1999 | ☐ | 09/13/1999 CLOSED |

| STAFFING | PROJECT=WEBCITY DPO<br>OWNER=ERIC REED |
|---|---|
| | PROJECT TRACKER ITEMS<br>MAIN MENU  SUMMARY (4BLOCK)  BENEFITS/FUNDING  STAFFING<br>            MILESTONES/TASKS  ISSUES           LINKS/FILE CABINET |

PROJECT:239-WEBCITY DPO

STAFFING

STAFF NEEDED:
- HEADCOUNT: # 5  & EXPENSE $ _____ (SALARY + BENEFITS)
- TYPE: ☑ JV  ☐ OS  ☐ SP  ☐ TLP  ☐ INTERN
- DETAILS:
  ```
  PROJECT CHAMPION - ERIC REED
  PROJECT LEADER - TRISH BRUDZ
  IM - RANDY WALKER
  ODC - PALLAVI SHARMA/RAUL
  ```

CURRENT STAFF:
- # 5  EXPENSE $ _____ (SALARY + BENEFITS)
- DETAILS:

LIST KEY PLAYERS & LEVEL OF INVOLVEMENT

| FILECABINET & LINKS | PROJECT=WEBCITY DPO<br>OWNER=ERIC REED |
|---|---|
| | PROJECT TRACKER ITEMS<br>MAIN MENU  SUMMARY (4BLOCK)   BENEFITS/FUNDING  STAFFING<br>            MILESTONES/TASKS   ISSUES            LINKS/FILE CABINET |
| PAGE OPTIONS: | USE THIS FORM TO ADD A NEW LINK:<br>DESCRIPTION: [          ]<br>HYPERLINK: [          ] [SUBMIT] |

LINK TO FILE OR URL - CLICK TO VIEW        LAST MODIFIED

TEAM MANAGEMENT - MAIN MENU

○   LIST YOUR TEAMS:
ENTER EMAIL: [ERIC.REED@INDSYS.GE.COM]  ..[          ]

○ LIST TEAMS UNDER: [-NO SELECTION-<br>TECHNOLOGY COMPONENTS<br>TECHNOLOGY NPI]
[          ]

○ LIST ALL TEAMS
○ SEARCH FOR A SPECIFIC TEAM
○ BROWSE THE SITE
○ REGISTER YOUR TEAM

<<IMPORTANT NOTES>>
  ○ USE YOUR MOUSE TO CLICK ON BUTTONS - USING "ENTER" ON YOUR KEYBOARD MAY CAUSE ERRORS
  ○ USE INTERNET EXPLORER 4.0 [THERE ARE KNOWN JAVA SCRIPT BUGS WITH NETSCAP

| TEAM PAGE | CHRIS FUSELIER'S STAFF |
| --- | --- |
| | SITE LINKS<br>NEWS    JOBJAR    MEETINGS  CALENDER    SAMEPAGE    TEAM ADMIN<br>TEAM MENU  PROJECTS  TASK LIST  LINKS & FILES  PARKING LOT  PERSONAL PAGE |

TEAM OVERVIEW:

| CHRIS FUSELIER'S STAFF PAGES | |
| --- | --- |
| | CLICK HERE TO POST A CUSTOM SITE IMAGE<br>YOU WILL NEED TO SEND THE IMAGES AS<br>AN ATTACHMENT IN YOUR EMAIL SYSTEM |

TEAM LEADER:CHRIS FUSELIER--TEAM LOCATION:PLAINVILLE,CT.

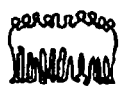 TEAM MEMBER'S [TOP OF PAGE]

| TEAM MEMBER | PHONE | LOCATION | CONTACT | |
| --- | --- | --- | --- | --- |
| CHRIS FUSELIER | 860 747-7852 8*756-7852 | PLAINVILLE,CT | WEB MESSAGE | OUTLOOK |
| ERIC REED | 756-7634,860-747-7634 | PLAINVILLE,CT | WEB MESSAGE | OUTLOOK |
| JOHN DOUGHERTY | 610 489 8945 OR 8*756 7305 | PA | WEB MESSAGE | OUTLOOK |
| JEFFERY BEARD | 8*756-5116 | PLAINVILLE | WEB MESSAGE | OUTLOOK |
| CHARLES BECKER | 278-5717 | SALEM | WEB MESSAGE | OUTLOOK |
| RALF CHRISTIAN | 698 42 13; 34 93 495 42 13 | BARCELONA | WEB MESSAGE | OUTLOOK |
| DAN DELLAVECCHIA | 262-5252 | SOMERSWORTH | WEB MESSAGE | OUTLOOK |
| DAN DELLAVECCHIA | 262-5252 | SOMERSWORTH | WEB MESSAGE | OUTLOOK |
| DONNA IZZO | 687-4583 | ALBANY | WEB MESSAGE | OUTLOOK |
| DON MCDONALD | 280-3077 | FORT WAYNE | WEB MESSAGE | OUTLOOK |
| JOHN MORBY | 756-7926 | PLAINVILLE | WEB MESSAGE | OUTLOOK |
| STEVEN PEAK | 393-4976 | MT VERNON | WEB MESSAGE | OUTLOOK |
| PHILIP PIQUEIRA | 756-7234 | PLAINVILLE | WEB MESSAGE | OUTLOOK |
| MARZIO POZZUOLI | 494-2056 | MARKHAM | WEB MESSAGE | OUTLOOK |
| INDRAJIT PURKAYASTHA | 756-7991 | PLAINVILLE | WEB MESSAGE | OUTLOOK |
| PAUL SINGER | 756-5265 | PLAINVILLE | WEB MESSAGE | OUTLOOK |
| MIKE VON KANNEWURFF | 756-7951 | PLAINVILLE | WEB MESSAGE | OUTLOOK |
| TIM WAITE | 349-7443 | DULUTH | WEB MESSAGE | OUTLOOK |
| GUILLERMO WILLE | 756-7007 | PLAINVILLE | WEB MESSAGE | OUTLOOK |
| KARL WILLIAMS | 278-7160 | SALEM | WEB MESSAGE | OUTLOOK |
| DAVID LOY | 663-5285 | SHREVEPORT | WEB MESSAGE | OUTLOOK |
| GERMAN NAVARRO B | | | WEB MESSAGE | OUTLOOK |
| MONTE ATWELL | 833-7072 | SCHENECTADY | WEB MESSAGE | OUTLOOK |
| JASON WASSERMAN | 756-7286 | PLAINVILLE | WEB MESSAGE | OUTLOOK |
| LARRY BOCK | 234-5437 | FORT EDWARD | WEB MESSAGE | OUTLOOK |
| LORI GRABLE | 756-7268 | PLAINVILLE | WEB MESSAGE | OUTLOOK |
| CHONG SHI GAN | 540-2168 | JURONG | WEB MESSAGE | OUTLOOK |
| KOEN CANDRIES | | GENT | WEB MESSAGE | OUTLOOK |
| CARL HORTON | 756-5127 | PLAINVILLE | WEB MESSAGE | OUTLOOK |

ISSUE TRACKER - MAIN MENU o  GET A LIST OF YOUR ISSUES:

ENTER EMAIL [_____] STATUS: [ALL / OPEN / CLOSED]

[_____]

o  GROUP & RISK REPORTS

MAKE SELECTION: [-NO SELECTION- / COMPONENTS] ... [_____]

o  ADD A NEW ISSUE
o  SEARCH DATABASE
o  LIST ALL REPORT GROUPS
o  REGISTER AS A NEW CPTS USER

<<IMPORTANT NOTES>>
o USE YOUR MOUSE TO CLICK ON BUTTONS - USING "ENTER" ON YOUR KEYBOARD MAY CAUSE ERRORS
o USE INTERNET EXPLORER 4.0 (THERE ARE KNOWN JAVA SCRIPT BUGS WITH NETSCAPE)

FIG. 26

METHOD AND SYSTEM FOR FACILITATING WEB-BASED INFORMATION EXCHANGE VIA A CENTRALIZED WEB STRUCTURE FOR MANAGING PROJECTS AND FUNDING REQUESTS

This application claims the benefit of U.S. Provisional Application No. 60/173,844, filed Dec. 30, 1999.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to computer network-based communication systems, and more particularly, to methods for facilitating Web-based information exchange within an organization.

The collections of computer networks known as the Internet and World Wide Web have produced a dramatic improvement in electronic communications and information access. Using remote terminals and local area networks connected with the Internet, individuals and organizations are now able to easily communicate electronically, by sending messages, and relaying, displaying and accessing information. Much of the information now available on the Internet is displayed on Web pages usually composed in Hyper-text Mark-up Language (HTML). Web pages, and connected series of pages called Web sites, typically are structured and connected using hyperlinks. Hyperlinks, by implicitly invoking the URL of a related Web page, offer the computer user "point and click" options for navigating through the pages of the Web site using a mouse. Usually, a Web site includes a home page that displays a directory or listing of multiple hyperlinks which direct the user to a number of different but related Web pages. A typical Web site is thus introduced by a home page, and the computer user uses the mouse to navigate through the multiple hyperlinks available on each page.

Despite the advantages offered by the Web, most Web site designers and administrators still struggle with composing and organizing a Web site to maximize user-friendliness. Problems frequently encountered by computer users navigating through a Web site include Web pages crowded with multiple hyperlinks, difficult to read or ambiguous hyperlinks, "missing hyperlinks" for accessing information known to be available on the site, and in general, poorly organized Web pages and sites. When one figures a few seconds or more for connecting to each new page, navigating through a poorly organized Web site is frequently a frustrating and time-consuming task.

For large organizations having multiple divisions, and especially organizations with nationally or internationally distributed divisions, the Web offers unique advantages for rapid and convenient intra-organization communications. However, the rapid growth of the Web has resulted in organizational problems that make finding specific information on the Web increasingly difficult and time-consuming. In particular, the vast amounts of information now available on the Web are not easily sorted and organized in such a way that a user can easily find desired information. The problems of Web site organization are especially acute for large organizations that desire to improve internal communications, simply because of the huge and varied amount of information to be organized and presented in a meaningful way to different users with different needs. Many large organizations leave this problem unaddressed and simply maintain Web sites that are very difficult for a user to navigate. Other organizations answer this problem by maintaining multiple, functionally disconnected Web sites for each division or department, leaving communication gaps between the divisions or departments.

It would therefore be desirable to provide a method for facilitating Web-based information exchange. It would also be desirable to provide a method for facilitating network communications among individuals in different divisions of an organization. It would further be desirable to provide a method that allows effective Web-based communications among individuals working in different geographic locations for the same organization. It would be still further desirable to provide a method to facilitate global, intra-organization communications that reduces phone and standard mail usage.

BRIEF SUMMARY OF THE INVENTION

In an exemplary embodiment, a method for facilitating Web-based information exchange includes the steps of providing a centralized Web structure for the Web-based information of an organization. The Web-based information includes Web pages and interactive Web-based applications. The Web structure includes multiple Web sites linked to at least one common site to which the Web-based information generated or owned by the organization is linked, directly or indirectly. Thus the Web structure provides a user with single point of entry. access to the Web-based information of the organization. Security features are added at each entry point so that a user accessing the structure is identified and provided with access to certain classes or types of information depending on the status of the user. Thus, the centralized Web structure provides a user with the ability to share Web-based information across the entire organization, and the information is available every day, at any time of day or night.

In one embodiment, the information linked in the centralized Web structure includes information targeted to specific individuals and teams of individuals within the organization, information targeted to specific projects within the organization, and information targeted to specific issues within the organization. The method also includes the step of providing access to interactive Web-based applications through the centralized Web structure. The applications provide on-line processes for carrying out different organizational tasks relating to the individuals, terms, projects and issues within the organization. In an exemplary embodiment, such interactive applications include on-line funding approval for projects, project tracking throughout the organization, and facilitating communications among team members or others having common tasks or project goals.

BRIEF DESCRIPTION OF THE DRAWINGS

FIG. 6 is a first portion of a program summary Web page for implementing the Web-based application for processing program funding requests;

FIG. 7 is a second portion of the program summary Web page;

FIG. 8 is a third portion of the program summary Web page;

FIG. 9 is a search page for implementing the Web-based application for processing program funding requests;

FIG. 10 is a first portion of an exemplary search results page for implementing the Web-based application for processing program funding requests;

FIG. 11 is a second portion of the exemplary search results page;

FIG. 12 is an exemplary summary report search input page for implementing the Web-based application for processing program funding requests;

FIG. 13 is an exemplary summary report page;

FIG. 15 is an exemplary first personal page for implementing the Web-based application for tracking communications and projects;

FIG. 16 is an exemplary second personal page for implementing the Web-based application for tracking communications and projects;

FIG. 17 is an exemplary third personal page for implementing the Web-based application for tracking communications and projects;

FIG. 18 is an exemplary first project tracking page for implementing the Web-based application for tracking communications and projects;

FIG. 19 is an exemplary second project tracking page for implementing the Web-based application for tracking communications and projects;

FIG. 20 is an exemplary third project tracking page for implementing the Web-based application for tracking communications and projects;

FIG. 21 is an exemplary fourth project tracking page for implementing the Web-based application for tracking communications and projects;

FIG. 22 is an exemplary fifth project tracking page for implementing the Web-based application for tracking communications and projects;

FIG. 23 is an exemplary sixth project tracking page for implementing the Web-based application for tracking communications and projects;

FIG. 24 is an exemplary team management main menu page for implementing the Web-based application for tracking communications and projects;

FIG. 25 is an exemplary team page for implementing the Web-based application for tracking communications and projects; and FIG. 26 is an exemplary issue tracker main menu page for implementing the Web-based application for tracking communications and projects.

DETAILED DESCRIPTION OF THE INVENTION

Figure 1:
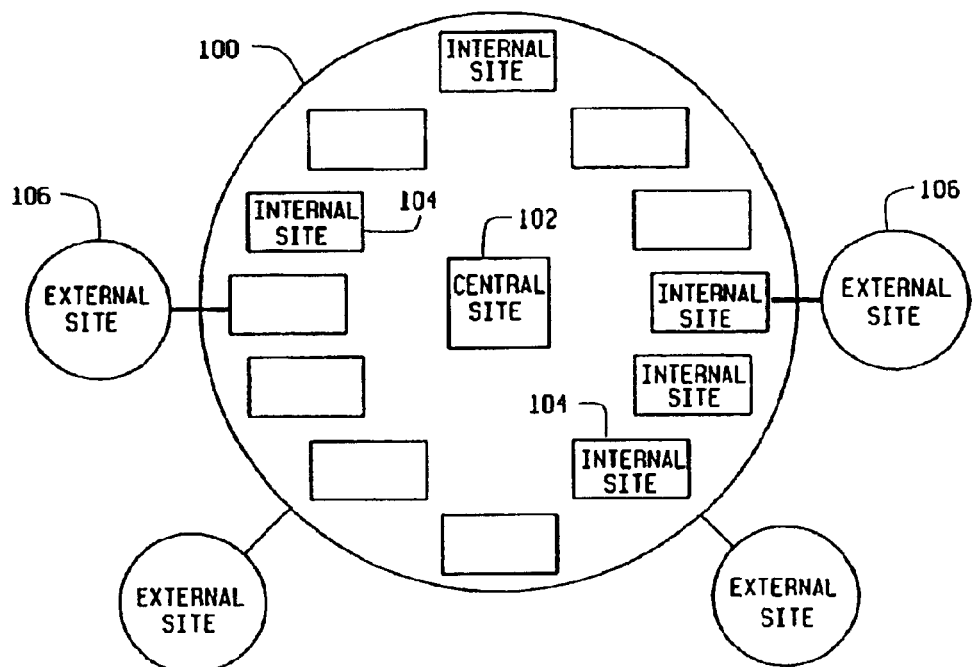
FIG. 1 is a schematic diagram of an exemplary Web structure embodying a method for facilitating Web-based information exchange.

In an exemplary embodiment, a method for facilitating Web-based information exchange includes providing a centralized Web structure for the Web-based based information of an organization. FIG. 1 shows an exemplary Web structure 100 embodying the method for facilitating the exchange of Web-based information within an organization. Web structure 100 is a Web-based computer network architecture centralized around a central site 102. Web structure 100 includes multiple internal sites 104 linked directly or indirectly to central site 102. In one embodiment, sites 104 are also interconnected directly or indirectly to one another. Thus, Web structure 100 is characterized by "single-point entry" capability, in other words the ability of a user to access any of the Web-based information stored in any of sites 102 and 104 after entering from a single point at any one site.

In one embodiment, Web structure 100 also maintains connections with a plurality of sites 106 external to Web structure 100, such as those maintained by outside service providers or customers of the organization. In one embodiment, sites 104 are further subdivided as sites within a site, to further facilitate navigation by the user. Security features are added at each site 104 that allows entry into structure 100, so that a user accessing the structure is first identified and after authorization, is provided with access to certain classes or types of information stored in structure 100 depending on the status of the user. Thus, centralized Web structure 100 provides a user with the ability to share information across the entire organization, and the information is available every day, at any time of day or night.

Web structure 100 is implemented on an internal computer network such as an Intranet. In an exemplary embodiment, Web structure 100 is connected to a distributed computer network such as the Internet, including that part of the Internet known as the World Wide Web. Remote users access Web structure 100 from a remote terminal using an Internet connection and a Web-browser as described in detail below. The term Web as used herein refers to the World Wide Web, wherein computers known as Web servers display graphical and textual information using "pages" composed in, for example, HTML, DHTML or ASP. However, although exemplary structure 100 described herein is connected to the Web, it should be understood that other types of distributed computer networks are suitable for using structure 100.

In an exemplary embodiment, Web structure 100 includes the Web-based information generated, owned or otherwise being distributed by an organization. The Web-based information is used to build central site 102 and sites 104, and includes Web documents or pages displaying information, and interactive Web-based applications including, for example, Web-based forms. As described in more detail below, the Web documents or pages display, for example, communications or other information targeted to specific individuals and to teams of individuals within the organization, information targeted to specific projects within the organization, and information targeted to specific issues within the organization.

The interactive Web-based applications include applications for accessing Web-enabled and Web-centric databases. More specifically, the database applications allow dynamic updating of specific Web-enabled databases accessible via the Web. For example, such applications include on-line processes for carrying out different organizational tasks relating to the individuals, teams, projects and issues within the organization. More specifically, in an exemplary embodiment, the interactive Web-based applications include an application for on-line funding approval for projects, another application for project tracking throughout the organization, and another application for facilitating communications among team members or others having common tasks or project goals.

Figure 2:
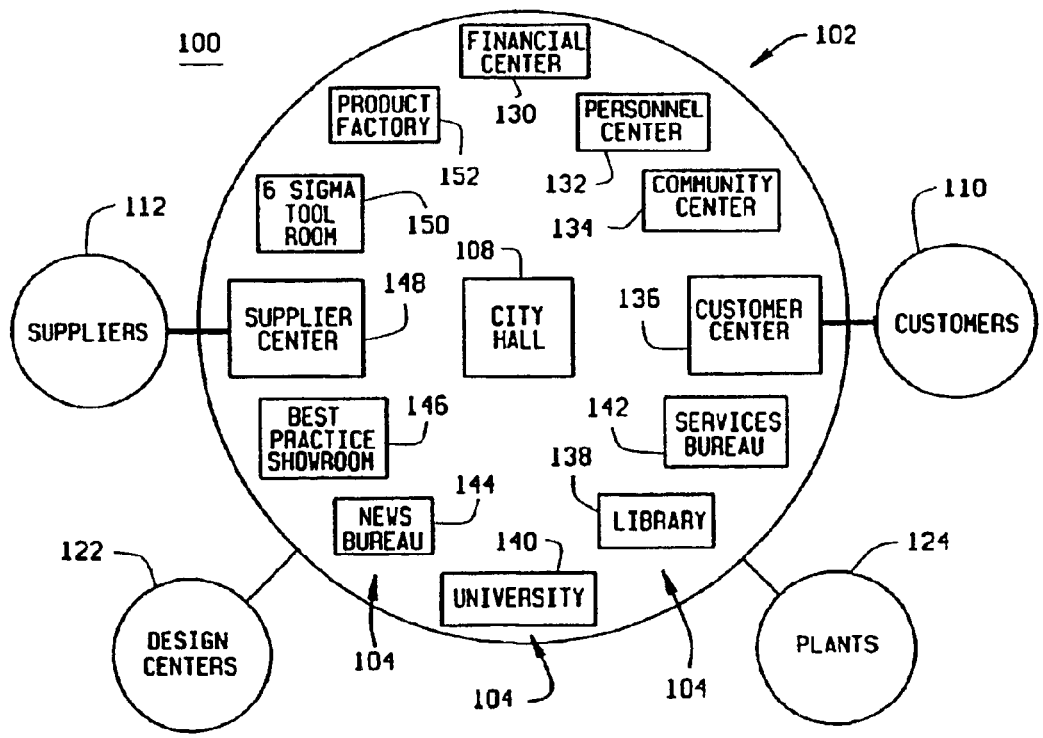
FIG. 2 is a schematic diagram of an exemplary navigational scheme applied to the Web structure.

In an exemplary embodiment, Web structure 100 is organized according to a centralized navigational scheme, and the method further includes the step of applying the centralized navigational scheme to Web structure 100. FIG. 2 is a schematic diagram of an exemplary centralized navigational scheme applied to Web structure 100. The navigational scheme includes multiple names, classifications or labels, wherein each name, classification or label is used to identify a different Web site 102 or 104 within Web structure 100. In one embodiment, to aid the user in identifying the information and functions provided at any given site, the names are based on a common theme, and the name of each site 102 or 104 is chosen to identify or suggest the function and content of the site. The scheme is centralized in that the name of site 102 is chosen to reflect the centralized function of site 102. All the names together, based on the common theme, form the navigational scheme that facilitates navigation throughout Web structure 100, from a single point of entry. The common theme for the names can be any theme that can be characterized by multiple names or labels, wherein each name or label is believed to be rapidly associated by users with particular information or function. Thus, centralized Web structure 100, along with the centralized navigational scheme, facilitates navigation among vast amounts of Web-based information stored among multiple Web sites.

As shown in FIG. 2, the exemplary navigational scheme uses a plurality of names of real locations to identify sites 102 and 104, and Web structure 100 includes elements typically found in some type of community. The community can be, for example, a city, or a business organization, and the elements can include, for example, real locations in the city or real departments or divisions in the business organization. In the exemplary embodiment, structure 100 is a virtual city built, owned and maintained by the organization. Each site 102 and 104 is a virtual co-location. Each virtual co-location is identified with a different real location, such as a library, factory, news bureau or other location or building commonly found in a city. The virtual co-location of central common site 102 is, for example, identified as a central administration building such as City Hall 108. Alternatively, the real location of each virtual co-location is a department or division commonly found in an organization. For example, in one embodiment the virtual co-locations are departments such as Personnel or Human Resources, Accounting, Customer Service, Information Management, Records, and the like. The virtual co-locations, or other names or labels forming the centralized navigational scheme, are then used to classify and thereby facilitate navigation throughout Web structure 100 from any single point of entry. Web structure 100 thus centralizes the organization's Web-based communications, so that widely geographically distributed divisions or department of the organization are able to communicate around the clock.

Referring again to FIG. 2, under the exemplary navigational scheme as shown, central site 102 is named City Hall 108 and sites 104 include a financial center 130, a personnel center 132, a community center 134, a customer center 136, a library 138, a university 140, a services bureau 142, a news bureau 144, a best practice showroom 146, a supplier center 148, a tool room 150, and a product factory 152. In the exemplary scheme shown in FIG. 2, external sites 106 include a site or sites 110 maintained by customers of the organization, and a site or sites 112 maintained by suppliers of the organization. External sites 106 may also include, for example, a site or sites 122 maintained by design centers of the organization, and a site or sites 124 maintained by plants of the organization.

As in a real community, the architecture of structure 100 changes over time as new information and functions (i.e. Web documents, forms, pages and applications) are added to established sites 104, and new sites 104 are built in response to changing demands of the community. Of course, the specific choices about which sites to add and when to add them are a matter of choice for a site administrator or Web-master, taking into account the changing demands of the organization that is using structure 100.

Regardless of the navigational scheme chosen, an advantage exists in choosing the names of sites 104 to rapidly convey the functions of, and information available from, each site 104. Under the exemplary navigational scheme in FIG. 2, the building name for each of sites 102 and 104 conveys the functions and information provided by the site by analogy to the functions and information typically supplied by the named location in a real community.

For example, central site 102 named City Hall 108 provides several functions identifiable with the functions provided by a real city hall. Such functions include, but are not limited to, supplying general information for the organization, maintaining a mayor's office, running a local council, maintaining a planning board, and maintaining security. Each of these functions includes sub-functions commonly understood to come within the actual functions of a city hall. So, for example, supplying general information from City Hall 108 includes greeting and introducing a user to Web structure 100, supplying a site directory, and supplying a site search function to help new users figure out where and how to go to different sites within structure 100. Maintaining a mayor's office for example includes supplying vision statements and goals, articulating standards of review and planning goals, and reporting on status and results. Mayor's Office functions also include for example, scheduling and reporting on staff meetings. Local council functions include maintaining a council calendar and agenda, reporting on meetings, and articulating review results along with the mayor's Office. Planning Board functions include site maintenance, maintaining a Web map, and supplying site templates and guidelines for adding and changing sites.

Financial Center site 130 provides financial results in various formats such as quarterly reports, provides project funding reports including which projects have been approved and a status of such projects, provides approved budgets and status, and processes budget requests.

Personnel Center site 132 maintains a human resources database including identifying and contact information for individuals, for example employees, having a relationship with the business organization. The contact information includes, for example, telephone number(s), e-mail address, title, and a description of the individual's skill set. Individuals such as employees have access to their own records in the database so that personal contact information can be updated. Personnel Center 132 also maintains a census bureau which provides a skills inventory, giving users the ability to search for personnel having a particular skill set. Personnel Center 132 also includes, for example, a regularly updated recruitment page listing contact information for recruiters, and a hiring hall for posting job vacancies and looking for work notices. Other information accessible through Personnel Center 132 includes, for example, employment policies and procedures of the organization, and a management awards page for nominating employees for performance awards. Personnel Center 132 also provides pages directed toward newly hired employees. These pages include, for example, local housing information for new hires moving into a new location, general company information, and an orientation package.

Community Center site 134 includes pages and links for providing information that promotes development of common interests among individuals in the business or organization. For example, Community Center 134 maintains newsgroups for common interest groups or business teams, a community bulletin board and calendar, and provides the meeting schedules and contact information for study groups for selected exams.

Customer Center site 136 maintains a customer gateway, regulating access to structure 102 following guidelines established by the organization, and implemented by requiring extra-network access codes. Customer Center 136 also serves as a portal to external customer web sites, such as external site 110.

Library site 138 provides a single starting point for searching for any type of information available in structure 102. For example, Library 138 stores and provides access to information on past projects of the organization including project specifications, design review documents, standards, market information and marketing literature, lessons learned, drawings, test results, patent and other intellectual property documents including patent applications, and other project-related information. Library 138 also includes a reference section providing a product reference section, product manuals, information on competitors, and standards and procedures of the organization. Library 138 further provides access to information resources available throughout structure 100, including files, databases, and search engines.

University site 140 includes sourcing and technology information resources, including access to on-line course material in self-teaching (previously recorded) format, and also in live (network meeting) format. University 140 also provides administrative f u inctions such as providing a course catalog, course curricula, registration functions, and certification and contact information for third party integrators associated with the organization. In one embodiment, university 140 includes a link to a research and development page or site maintained by the organization's research division. The research and development site includes, for example, summaries of ongoing research and development, as well as links to on-line training applications Services Bureau site 142 provides pages for communicating and receiving information from service providers and consultants working with or for the organization. For example, Services Bureau 142 provides Help Desk pages that are monitored by the consultants or experts. Services Bureau 142 further provides, for example, information from a Chief Engineer's Office, including design and safety reviews of products, and production guidelines and standards. In one embodiment, Services Bureau 142 also provides patent-related information from an internal "Patent Office", including descriptions of available intellectual property services, and schedules and reports of patent council meetings.

News Bureau site 144 provides news relating to the business of the organization. Such news includes, for example, links to corporate news pages and to an on-line business forum offering updates and discussion on the business activities of the organization. In one embodiment, news bureau 144 provides access to radio broadcasts that are broadcast through the user's local machine, and access to video-conferencing applications. In another embodiment, news bureau 144 also provides access to applications for daily personal time management.

Best Practice Showroom site 146 provides information, forms, processes and tools for a range of management activities, focussing on describing best practices for the organization as detailed from individuals or sources outside the organization. The best practice information as provided by external sources is brought into the organization for internal consideration and implementation. Best practices specifications are applied to, for example, internal budgeting and hiring decisions, engineering assessments for each practice, Y2K reviews, and the like.

Supplier Center site 148 provides information on suppliers for the organization, including contact information, descriptions of supplier expertise, projects involving specific suppliers, and supplier contracts. Supplier Center 148 also provides a secure gateway for suppliers wishing to access structure 100 from outside the intranet. The gateway is monitored by requiring extra-network access codes, as is also the case with extra-network customer access.

Tool Room site 150 provides several types of tools for the system user. For example, Tool Room 150 provides Web tools including Web templates, Web infrastructure and Web monitoring. Tool room 150 also provides engineering tools and on-line database applications that have been developed or purchased by the organization.

Figure 3:
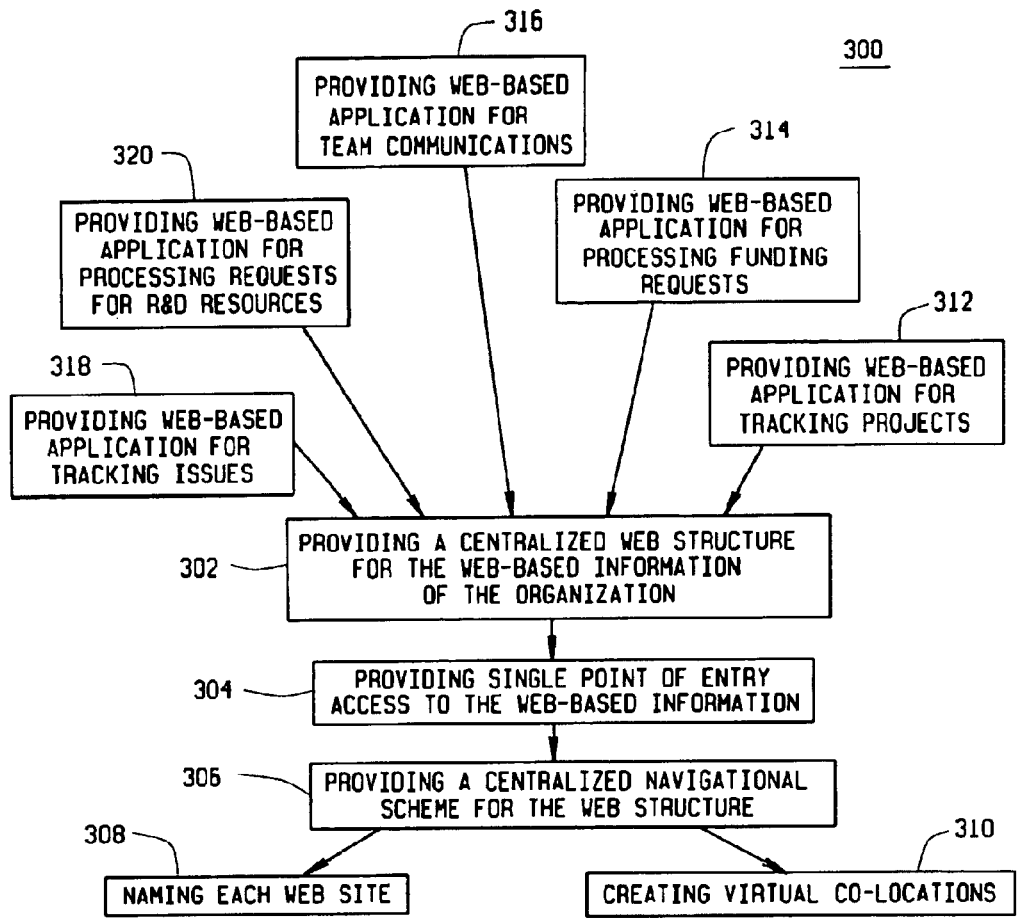
FIG. 3 is a flow diagram of the method for facilitating Web-based information exchange.

Product Factory site 152 provides product-related information and tools for the user. For example, Product Factory 152 provides access to production process maps, and to other tools and information on the organization's processes for developing and introducing new products. In one embodiment Product Factory 152 also provides access to an interactive Web-based application as described below, that allows the user to track the progress of multiple projects, which each include one or more products, through development within the organization, FIG. 3 is a flow diagram of a method 300 using structure 100 to facilitate Web-based information exchange. In an exemplary embodiment, method 300 includes providing 302 centralized Web structure 100 for the Web -based information generated by the organization, and providing 304 a user with single point of entry access to the Web-based information. In one embodiment, method 300 further includes providing 306 a centralized navigational scheme for Web structure 100. Providing 306 the centralized navigational scheme includes naming 308 each site 104 in Web structure 100 with a name that suggests or is associated with the function and content of each site 104. In one embodiment, the names are united under a common theme, such as locations or buildings in a city as described above, or as divisions or departments within an organization. In an alternative embodiment, the names are not united under a common theme, but simply are chosen independently of one another to convey to the user the function and content of each site 104.

In an exemplary embodiment of method 300, providing 306 a centralized navigational scheme is practiced by creating 310 a plurality of virtual co-locations on a Web-server. The virtual co-locations correspond, for example, to site 102 and sites 104 shown in FIG. 2 and described in the accompanying text, each identified with a different location or building in a community. The virtual co-locations are then used to facilitate navigation through Web structure 100, thus aiding access to the Web-based information, including both Web pages and Web-based applications.

In one embodiment, providing 302 centralized Web structure 100 as practiced with particular reference to Web-based information that includes interactive Web-based applications, includes providing 312 a Web-based application for tracking multiple projects as each project progresses through successive developmental stages within an organization, providing 314 a Web-based application for processing funding requests for specific projects, and providing 316 a Web-based application for transmitting team communications among members of a team. In alternative embodiments, providing 302 centralized Web structure 100 further includes providing 318 a Web-based application for tracking issues regarding specific projects, and providing 320 a Web-based application for processing requests for use of research and development resources.

By adding specific Web-based information to central Web-structure 100, and in particular by providing Web-based applications targeted to the specific needs of the organization, method 300 is adaptable to a wide variety of organizations and organizational schemes within those organizations. For example, an organization might use an organizational scheme that includes multiple steps or levels of managerial decision-making on any given idea being considered by the organization. Such ideas include, for example, ideas considered potentially helpful to the operations of the business or organization, and that stem from any type of source, within or outside of the organization. For example, the ideas might include new product ideas and product improvement ideas, as well as ideas for increasing productivity or efficiency. Each new idea is taken up by management personnel at a first level in the organization. Each idea is then assessed by the management personnel, and then action is taken on the idea depending on the outcome of the assessment. Each action has the potential to shift the responsibility for action to another level in the organization. Depending on the nature of the idea and the action taken at the first level, the responsibility for action shifts to any one of a number of possible organizational levels (e.g. departments or divisions) within the organization. For example, possible actions on any one idea include a decision to immediately implement the idea with existing resources, leading to a "do it" or "immediate action" directive. An alternative action would be a decision that the idea requires funding and thus funding approval, leading to a "needs funding" directive and appropriate intra-organizational review. Another alternative action would be a decision that the idea requires use of research and development resources, leading to a "needs R&D resources" directive and appropriate review within the organization. Yet another alternative action would be a "hold" directive taken on ideas not currently warranting further action. Each of these different actions shifts the responsibility for action to a different individual or group of individuals within the organization.

Using method 300, any idea, and subsequent actions taken on the idea, is managed and tacked using Web structure 100, by adapting Web structure 100 and the Web-based information accessible thereon, to the organizational scheme and needs of the organization. Web structure 100 is adapted by adding and removing sites 104 and 102, changing the names or labels of the sites, adding and removing Web-based information and applications to sites, and so on. Thus, for example, method 300 as applied to the above-described organizational scheme includes providing Web-based information, including Web-based applications, specifically targeted toward implementing the types of decisions or actions taken by the organization. The Web-based information, and in particular the Web-based applications are written to conform to standard administrative procedures practiced by the organization.

Thus, for example, method 300 as applied to an organization following the organizational scheme as described above includes providing 314 a Web-based application for processing funding requests for specific projects. The Web-based application for processing funding requests is adapted to conform to a standard funding review process practiced by the organization. Method 300 also includes providing 316 a Web-based application for transmitting team communications among members of a team. With reference to a specific organization, providing 316 a Web-based application thus includes providing a Web-based application directed toward specific teams as chosen and organized by the organization. In an exemplary embodiment, and as described in more detail below, each application is adaptable to include features specified by the organization.

Figure 4:
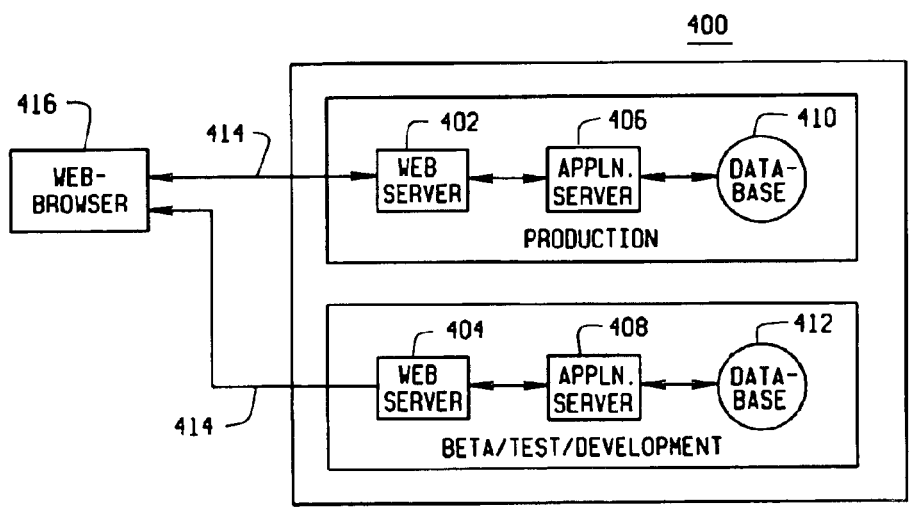
FIG. 4 is a block diagram of an exemplary network for implementing the method for facilitating Web-based information exchange.

FIG. 4 is a block diagram of an exemplary system architecture 400 for implementing method 300. System architecture 400 includes a central Web server 402, or production server, and in one embodiment, an adjunct server 404 for development and test applications. Servers 402 and 404 are each linked to an application server, 406 and 408 respectively. Application servers 406 and 408 each store respectively, a database 410 and 412. Web servers 402 and 404 are linked by a network connection 414, such as an Intranet or an Internet connection, to a remote terminal, i.e., a user device, 416. A Web-browser is installed on remote terminal 416 as described below. Connection 414 is, for example, a telecommunications device such as a dedicated network cable, conventional phone line and modem, cable-free cellular digital packet transfer device, or other known remote data transfer system such as, for example, a satellite link. In one embodiment, a plurality (not shown) of remote terminals 416 are linked to servers 402 and 404 via connection 414. In another alternative embodiment, a plurality of remote terminals (not shown) are linked to Web servers 402 and 404 to form an Intranet.

Web servers 402 and 404 have stored in memory (not shown) hyperlinked data files containing the information stored at each site 104. The data files are composed in, for example, HTML, DHTML or ASP (Active Server Pages) format. In one embodiment Web server 402 also stores an e-mail application (not shown). Application servers 406 and 408 have stored in memory database applications for providing dynamic updating and manipulation of databases 410 and 412. More specifically, the Web-based applications are based in Java script, ASP, Visual Basic, or are spreadsheet based. Databases 410 and 412 are each, for example, a commercially available Web-enabled database such as Oracle DB from Oracle Corporation, Redwood Shores, California. By updating and manipulating databases 410 and 412, the Web -based applications provide on-line tools for carrying out processes which are practiced throughout an organization, thereby consolidating and standardizing the processes throughout the organization.

The Web-browser is, for example, Netscape® by Netscape Communications Corporation, or Internet Explorer & by Microsoft Corporation, and is downloaded onto remote terminal 416. The location of specific pages on the Web, i.e. the Web address of each page, is specified by a uniform resource locator (URL), which is an alphanumeric string representing the address of server 402 on the Web.

Multiple pages stored on Web server 402 are linked together via hyperlinks to form sites 104. Hyperlinks are represented on a computer screen by a graphical icon such as a button or a highlighted line of text. The hyperlinks are each configured to implicitly invoke another URL when a computer user clicks on a computer mouse button while a mouse-controlled screen cursor is positioned over a hyperlink icon. Thus, using exemplary navigational scheme 200 described above, a remote user at remote terminal 416 initially accesses a virtual co-location stored on Web server 402 by typing a specified URL into the Web-browser, or by clicking with a mouse on a supplied hyperlink.

As described above, each site 104 stores a subset of all the Web-based information generated by the organization and is accessible through Web structure 100. However, to facilitate navigation through Web structure 100, the Web-based information stored at each site 104 corresponds or is associated with the name chosen for site 104. So, for example, in one embodiment, Financial Center 130 as described above provides access to Web-based applications embodying processes or methods that provide specialized financially related services to the user.

Figure 5:
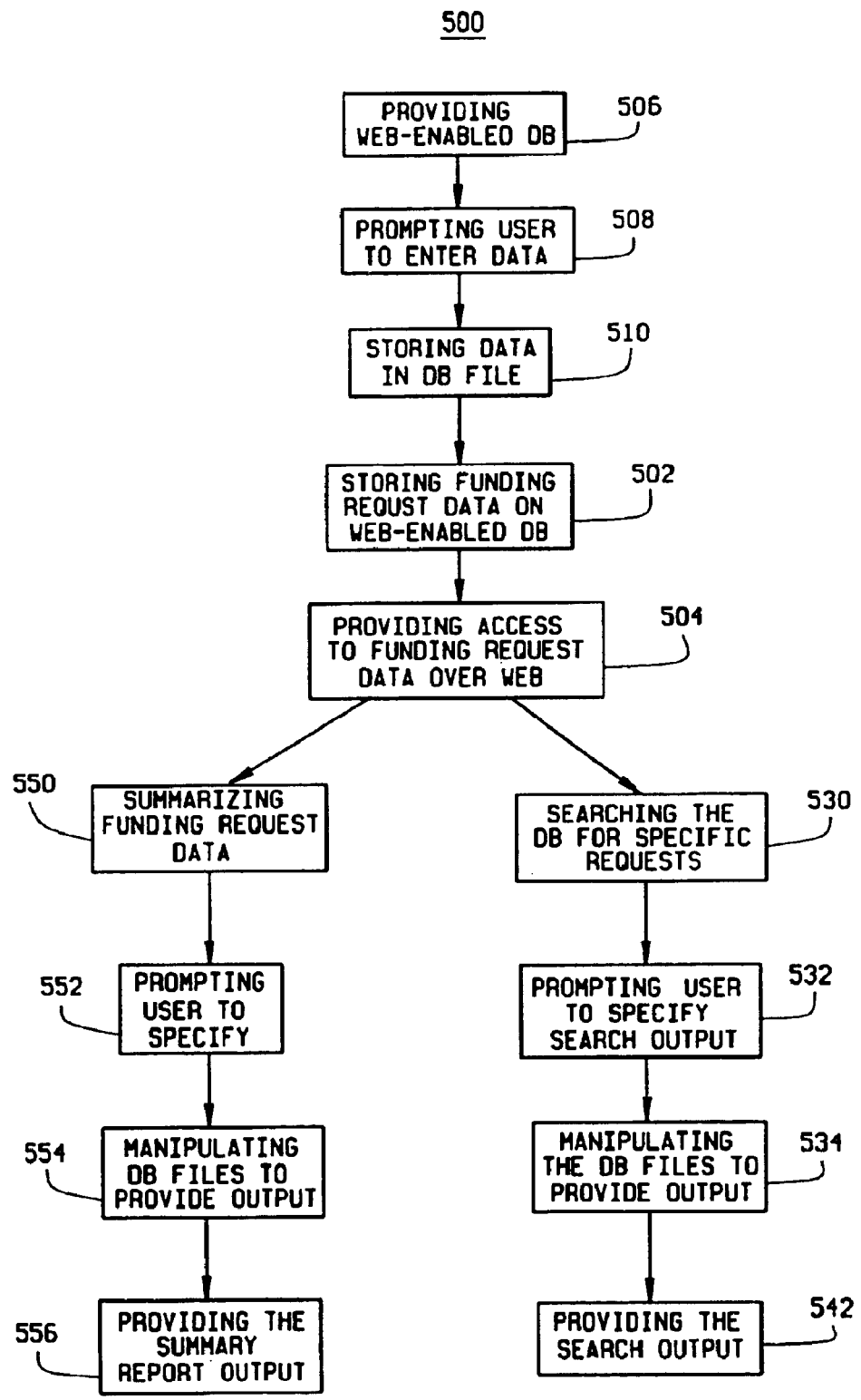
FIG. 5 is a flow chart of a Web-based application for processing program funding requests.

In an exemplary embodiment, services provided by Financial Center 130 include processing of funding requests, and thus Financial Center 130 includes a Web-based application embodying a method 500, shown in FIG. 5, for processing funding requests, such as requests for funding of a specified project. In particular, method 500 is directed toward converting a manual finding review process to a Web-based process. Method 500 still requires manual input of a set of data, but automates submission of funding requests, reporting of funding requests, and also allows global access to the funding request data within the organization. In one embodiment, method 500 includes storing 502 funding request data on Web-enabled database 410 and providing 504 access to the funding request data over the Web.

Storing 502 the funding request data includes providing 506 a Web-enabled database for storing the funding request data, prompting 508 a user to enter funding request data, and storing 510 the funding request data in a database file. The funding request data includes, for example, a project name, a category of business to which the project belongs, a division of the organization to which the project belongs, and financial data regarding the project, including cost figures and growth figures.

FIGS. 6–8 show an exemplary program funding request page 520 for prompting 508 a user to enter funding request data. Program funding request page 520 includes labeled input spaces, organized in sections, prompting the user to enter specific information via a computer keyboard or other input device. The sections of program funding request page 520 include a program description section 522, a program cost section 524, and a program benefits section 526. Program description section 522 includes identifying information such as the name of the person making the request, contact information for the requesting person, a project name, and other data indicating the category and type of business of the project. Program description section 522 further includes, for example, the objectives of the project, timing of the project, and input spaces for entering projected cost breakdowns among different divisions of the organization. The cost breakdowns in cost section 524 include, for example, annual figures for total expense, capital investment costs and labor costs for different divisions. In one embodiment, projected costs for coming years are also included. Program benefits section 526 includes projected annual sales and benefits figures and breakdowns.

Referring again to FIG. 5, method 500 further includes searching 530 the database for specific funding requests by prompting 532 a user to specify a search output from the database, and manipulating 534 the database files in response to the request to provide the specified output. FIG. 9 shows an exemplary search page 536 for searching previously entered funding requests. Search page 536 includes input spaces 538 for entering search criteria. Search criteria include, for example, the name of the person requesting the funding, project name, business division of the organization in which the project is categorized, function under which the project is categorized, and the like.

FIGS. 10 and 11 show an exemplary search results page 540 displaying a search output that is provided 542 in response to a funding request search. Search results page 540 includes an entry for each project name for which a funding request has been filed in the database. Each entry lists the project name, business, function, type, cost figures, benefits figures and a prioritization code.

In one embodiment, as shown in FIG. 5, method 500 includes summarizing 550 funding request data for a division of the organization. First, the user is prompted 552 to specify a summary output, and the database files are manipulated 554 to provide the summary report output. Finally, a summary report is provided 556. FIG. 12 shows an exemplary summary report search input page 560 for implementing steps 550–556 of method 500. Summary report search page 560 includes input spaces 562 for entering, for example, grade, function and business designations specifying the search criteria. Summary report search page 560 also includes radio buttons 564 and 566 for specifying the organization of a summary report output provided in response to a summary report request. Specifically, by clicking on button 564, the summary report output is organized by function. Alternatively, by clicking on button 566, the summary report is organized by business.

FIG. 13 shows an exemplary summary report page 570. Summary report page 570 includes a partial listing of projects for which funding is requested, the partial listing including all projects within the business or function satisfying the search criteria specified by the user using summary report search page 560. In alternative embodiments, the method further includes the step of prioritizing all program finding requests within a specified group. Prioritization of each product is done, for example, by assigning a grade or priority code to each funding request. For example, prioritizing is done by a business unit for all funding requests falling within the sphere of influence of the business unit. For example, a summary report page 570 is generated of all funding requests satisfying search criteria that specify all funding requests within the sphere of influence of the business unit. A leader or member of the business unit then assigns a priority code to each funding request reported on summary report page 570. Alternatively, prioritizing is done by a business leader for all funding requests across business units under the leader. Once a priority grade or code has been assigned to a funding request, the prioritizations are reported, for example, on summary report page 570 or on a separate, supplemental report page (not shown). In another alternative embodiment, method 500 further includes coding with a status code the funding status of each program funding request, to indicate to a user the current status of a program funding request within the funding approval process. The status code is, for example, reported on summary report page 570 or any report page that reports information about specific program funding requests in response to a user search request.

In an exemplary embodiment, Product Factory 152 provides access to a Web-based application embodying a method 600 for tracking communications and projects within an organization. More specifically, method 600 provides on-line, Web-based exchange of communications classified in multiple ways, thus directing the communications to different individuals or groups of individuals depending on the type of information. More specifically, method 600 directs communications to specific individuals, to all individuals involved in the same project, to all individuals on the same team, or to any individual having responsibility or interest in an issue. Thus, method 600 provides centralized, easily accessed, updated and ongoing tracking of the day-to-day detail and progress of projects, issues and communications within the organization. Method 600 is particularly useful for organizations having multiple individuals working on the same project, team or issue from geographically or administratively separate divisions or departments.

Figure 14:
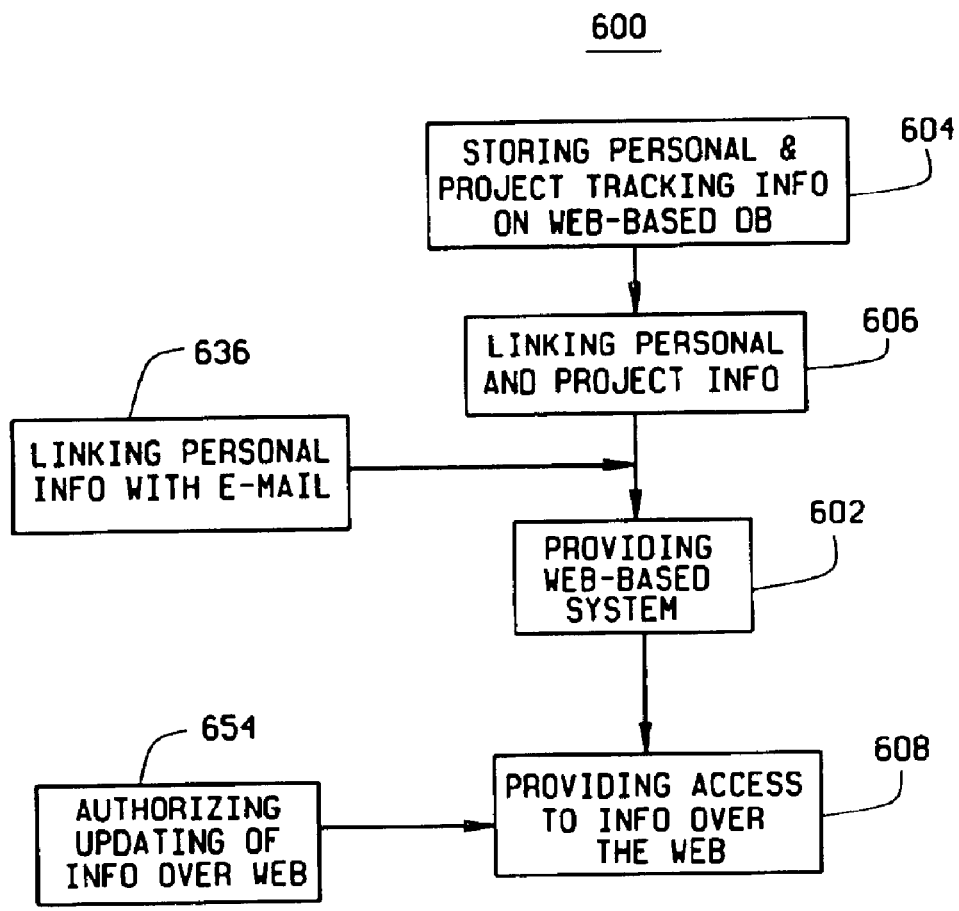
FIG. 14 is a flow chart of a Web-based application for tracking communications and projects.

FIG. 14 shows a flow chart for an exemplary embodiment of method 600. In one embodiment, method 600 includes providing 602 a Web-based system for reporting personal information and project tracking information for a plurality of Web-users, wherein the personal information and project tracking information are linked. Providing 602 a Web-based system includes storing 604 personal information and project tracking information on a Web-enabled database stored on a Web-server, and linking 606 the personal information and project tracking information so that personal information is accessible when project tracking information is accessed, and further so that project tracking information is accessible when personal information is accessed. Method 600 further includes providing 608 access to the personal task information and project tracking information over the Web.

FIG. 15 shows an exemplary home or first personal page 610 for implementing method 600. Home page 610 includes, for example, a plurality of hyperlinks guiding the user through available information, including personal information and project tracking information for an individual user. Page 610 summarizes, displays and provides links to personal information for a specified user authorized for access to Web server 402 (shown in FIG. 4). The personal information includes, for example, a personal schedule and calendar, personal messages, a listing of personal tasks, a listing of project tasks, and daily journal entries. In one embodiment, first personal page 610 includes several subsections displaying, for example, a menu 622 of personal organizer site links, an inbox 624, a meeting schedule 626, a personal task box 628, a project task box 630, and a daily journal input space 632. Menu 622 displays a plurality of hyperlinks 634 which guide the user through pages of linked information in the system. From menu 622 as displayed on first personal page 610, the user links to additional personal information and project tracking information by, for example, selecting one of hyperlinks 634, or by selecting hyperlinks embedded elsewhere on pages as they are displayed. The user navigates through successively displayed pages to view linked information, and updates personal and project information so that displayed pages are modified as information is updated.

Referring again to FIG. 14, in one embodiment providing 602 a Web-based system includes linking 636 personal information with an e-mail application so that e-mail messages are displayed with other personal information. FIG. 15 shows inbox 624, which lists all new unread e-mail messages for the specified user. An icon 640 such as a mailbox operates as a hyperlink to a message page (not shown) which displays a second listing of all new e-mail messages, wherein each entry in the listing is a hyperlink to view a page displaying the message. To keep track of incoming messages, messages are marked with a mouse click by the user when read.

Personal task box 628 includes a listing of all due or past due tasks assigned to the specified user. The listing includes an entry for each task, wherein each entry includes, for example, a due date, a status box for indicating whether the task has been completed, a number of hours devoted to completing the task to date, a description of the task, and any applicable project codes or task codes. Project task box 630 includes a listing of project tasks due or past due, the listing including an entry for each task. Project tasks are those tasks assigned to a project team, as opposed to an individual. Each entry includes, for example, a status box, a project identification code, a due date, and a project task description. Both personal tasks and project tasks are indicated as complete, or given a completion status, by entering updated with a keyboard or mouse.

FIGS. 16 and 17 show an exemplary second personal page 650, and an exemplary third personal page 652 respectively, when the corresponding hyperlink 634 is selected from homepage 610 (shown in FIG. 15). For example, second personal page 650 displays a breakdown and status of project tasks as assigned to the specified user, or assigned to another individual by the specified user. An input space or window 651 prompts the specified user to add a personal task if desired. Further, tasks are checked off or otherwise indicated on the personal page when complete. Similarly, third personal page 652 lists issues assigned to the specified user or assigned by the specified user to another individual. Issues include problems or potential problems that have been identified and assigned a risk score based on the probability of occurrence and the impact if the problem does occur. Each issue requires abatement plans and trigger dates which are to be tracked. Additional tasks may be generated by the identification of issues. As with the project tasks, issues are checked off or otherwise indicated on the personal page when complete. Further, one embodiment of third personal page 652 includes an icon indicating a hyperlink to an issue input page which the specified user uses to add an issue. In alternative embodiments of method 600, additional personal pages are added to provide additional project tracking and personal organization functions. For example, in one embodiment of method 600, an additional personal page (not shown) includes input spaces and hyperlinks guiding the user through adding a new project to the personal information reported on personal pages 620, 650 and 652.

FIGS. 18–23 show exemplary project tracking pages for tracking completion of tasks and milestones toward completion of a project. The project tracking pages are displayed for example, when a project tracker hyperlink 634 (shown in FIG. 15) is selected from home page 610 (shown in FIG. 15). As shown in FIG. 14, displayed project information is subject to editing and updating by a project owner, who is a user authorized 654 by Web server 402 to make such changes. FIG. 18 shows an exemplary first project tracking page 660 which in one embodiment displays project start and end dates, a milestone listing, and a task listing. As with the personal information displayed on the personal pages described above, all project tracking information is subject to editing or updating using hyperlinks displayed on the pages. Therefore, project start and end dates, milestones and tasks can be modified by a user specified as the "owner". For example, an owner can own a task or an issue, and is the individual responsible for the given task or issue. In one embodiment, the milestone and task entries include such information as status, description, owner, due date, comments, and the like.

FIG. 19 shows an exemplary second project tracking page 670 on which basic project identification information including, for example, a project code number, project name, project owner, description, product line and team assignment, is displayed. Page 670 also displays a project schedule, benefits and budget breakdown, issue summary and risk assignment. Again, the project owner can edit or update page 670, as well as the additional project tracking pages described below.

FIG. 20 shows an exemplary third project tracking page 680 on which basic anticipated project benefits and budget information is displayed. The benefits and budget information includes, for example, a project budget breakdown, a calculation of financial benefits and a calculation of net benefits.

FIG. 21 shows an exemplary fourth project tracking page 690 on which issues and risks of the project are displayed. In one embodiment, page 690 displays, for example, a risk summary, and a summary of open and closed issues relating to the project.

FIG. 22 shows an exemplary fifth project tracking page 700 on which project staffing information is displayed. The project staffing information includes, for example, a head count of individuals assigned to the project, names and titles or duties of individuals assigned to the project, and a calculation of staffing expenses.

FIG. 23 shows an exemplary sixth project tracking page 710 which offers input spaces for describing and adding a new link regarding the project.

FIG. 24 shows an exemplary team management main menu page 720 for tracking teams of individuals assigned to work under a specific individual, or on specific tasks, issues, projects, or the like. Page 720 is displayed, for example, when a team management hyperlink 634 is selected from home page 610. From page 720, a user follows hyperlinks to, for example, view a list of all teams within the organization, search for a specific team, browse the site, or register a team by providing team information.

FIG. 25 shows an exemplary team page 730 displayed upon requesting a search from page 720, and displays a list of all team members assigned to work under a particular individual as specified on page 720.

FIG. 26 shows an exemplary issue tracker main menu page 740 which is displayed, for example, when issue tracker hyperlink 634 (shown in FIG. 15) is selected from home page 610 (shown in FIG. 15). Issue tracker main menu page 740 tracks issues across projects, individuals and teams. To track an issue, the user follows hyperlinks and provides input as prompted by input spaces to specify and track an issue.

In one embodiment, access to Web server 402 (shown in FIG. 4) is limited so that only authorized users with an access code can view and manipulate information stored on Web server 402. For example, access is machine-limited so that only authorized remote computers have permission to get through a security firewall. To implement the firewall, the intranet, which is composed of terminals linked by local connections to Web servers 402 and 404 (shown in FIG. 4), includes a proxy server or servers (not shown) through which all communications with computers outside the intranet must take place. The proxy server is programmed to validate queries from a user on any machine authorized to communicate with the Intranet via a remote terminal 416 (shown in FIG. 4). The proxy servers include special programs enabling them to forward valid requests or queries from authorized machines through the firewall to Web server 402 and 404. In an alternative embodiment, the security element identifies authorized users rather than machines. This approach is more complex than the basic firewall approach because queries or requests from a user from any remote machine 416 are validated using an encrypted unique identifier. To implement the encryption approach, one embodiment uses a security tool, i.e. a secure user management system that integrates with industry-standard LDAP file structure, such as SiteMinder® from Netegrity, Inc. of Waltham, Mass. The unique identifier is, for example, a password or validation code consisting of an alphanumeric string. The unique identifier is encrypted to frustrate password sniffing by individuals who intercept unencrypted passwords as they pass from machine to machine through network 400 (shown in FIG. 4). The proxy server validates the encrypted unique identifier, and allows access to Web servers 402 and 404, and associated local Intranet. In another alternative embodiment, Web server 402 or a proxy server identifies authorized users using a one-time or limited use password supplied by the server on request from the user.

The Web-based system and methods thus allow an organization to be "e-linked" for all information, processes, and projects of the organization, and across locations or divisions of the organizations that may be distributed across the world. The methods enable such interactions and communications as computer network-based meetings, chat rooms, access to data libraries and other on-line tools across the organization. In terms of project or product development, the Web-based methods facilitate real-time, electronic collaborations, monitoring of progress, the efficient distribution of expert help and advice, and 24-hour access to information. Thus, the Web-based methods consolidate and organize information to facilitate Web-based communications within a large organization.

The methods also improve Web-based communications among individuals working in different geographic locations for the same organization by organizing Web-based information in a readily learned and easily navigated system. Still further, the methods, by facilitating Web-based communications, reduce phone and standard mail usage among individuals in geographically distant locations. The methods are therefore particularly useful for large organizations having multiple nationally or globally distributed divisions.

With respect to quality control and customer service, the methods provide real-time links to customers, plants and suppliers in conjunction with the centralized organization to facilitate access by customers and suppliers to information. The on-line information is available to customers and suppliers twenty-four hours a day and seven days a week. Thus, the methods are believed to have a pronounced and desirable effect on the time required for the organization to respond to changes in the marketplace, as well as to the needs of customers, clients and suppliers.

While the invention has been described in terms of various specific embodiments, those skilled in the art will recognize that the invention can be practiced with modification within the spirit and scope of the claims.

What is claimed is:

1. A method for facilitating Web-based information exchange, said method comprising:

providing a centralized Web structure for the Web-based information of an organization, the Web structure comprising a plurality of Web sites linked together to form Web structure;

identifying a user requesting access to the Web structure by a password that is configured to be used for a limited time; and tracking, via the Web structure, a shift of responsibility of making a first decision on a funding request from a first user to a second user, wherein the shift occurs when a second decision is made on the funding request by the first user.

2. A method in accordance with claim 1 further comprising the step of storing the Web-based information of the organization in the plurality of Web sites in the centralized Web structure.

3. A method in accordance with claim 2 wherein said step of providing a centralized Web structure comprising a plurality of Web sites linked together comprises providing sufficient links among the Web sites so that all the Web-based information is accessible from any one location in the Web structure.

4. A method in accordance with claim 3 wherein said step of providing sufficient links among the Web sites so that all the Web-based information is accessible from any one location in the Web structure comprises the step of providing at least one point of entry to the Web structure from which all the Web-based information of the organization is accessible.

5. A method in accordance with claim 2 further comprising the step of applying a centralized navigational scheme to the centralized Web structure.

6. A method in accordance with claim 5 wherein said step of applying a centralized navigational scheme to the centralized Web structure comprises the steps of:

providing a plurality of names for the plurality of Web sites, wherein the names are chosen to identify the content of each Web site and wherein the names are based on a common theme; and assigning a name to each of the plurality of Web sites.

7. A method in accordance with claim 6 further comprising the step of creating a plurality of virtual co-locations wherein each Web site is a virtual co-location.

8. A method in accordance with claim 7 wherein said step of applying a centralized navigational scheme to the centralized Web structure comprises the steps of:

providing a plurality of location names for the plurality of Web sites, wherein the location names are chosen from real locations in a community; and assigning each location name to a Web site so that the location name of each Web site identifies content of the Web site.

9. A method in accordance with claim 8 wherein the Web-based information comprises a plurality of data files and wherein said step of storing the Web-based information in the plurality of Web sites comprises the step of storing a subset of the plurality of data files at each Web site, the subset of data files at each Web site providing function and content identifiable with the location name of the Web site.

10. A method in accordance with claim 9 further comprising the steps of:

creating a central virtual co-location; and assigning a name of a real central administration building to the central virtual co-location.

11. A method in accordance with claim 10 wherein said step of providing a centralized Web structure comprises the step of linking the plurality of Web sites to the central virtual co-location.

12. A method in accordance with claim 10 wherein said step of linking the plurality of Web sites to the central virtual co-location comprises the step of linking each of the plurality of Web sites at least indirectly to the central virtual co-location.

13. A method in accordance with claim 1 wherein said identifying a user comprises identifying the user requesting access to the Web structure by a password that is configured to be used for at most one time.

14. A method for facilitating Web-based information exchange, said method comprising:

providing one Web structure for storing the Web-based information of a business; and electronically tracking, via a Web-based application, actions that include a decision retarding implementing an idea and a decision regarding obtaining funding to implement the idea, wherein one of the actions occurs at a level within the business that is separate from any other levels within the business in which remaining of the actions occur.

15. A method in accordance with claim 14 further comprising the step of providing Internet access to the Web structure to a plurality of users authorized by the business.

16. A method in accordance with claim 14 wherein said step of providing one Web structure for storing the Web-based information of business comprises the step of providing a plurality of Web sites linked together to form the Web structure, wherein any one Web site is accessible from another Web site.

17. A method in accordance with claim 16 wherein said step of providing a plurality of Web sites linked together to form the Web structure comprises providing a plurality of Web sites each having distinct content.

18. A method in accordance with claim 17 further comprising the step of providing a navigational scheme for a user to navigate the Web structure.

19. A method in accordance with claim 18 wherein said step of providing a navigational scheme for a user to navigate the Web structure comprises the step of providing a name for each Web site wherein the name for a Web site identifies the content of the Web site.

20. A method for facilitating computer network-based information exchange, said method comprising the steps of:

providing a plurality of sites for containing network-based information on a central server;

linking the plurality of sites to one another so that any one of the sites is at least indirectly accessible from any one of the remaining sites;

naming each of the plurality of sites on the central server wherein all of the plurality of names are based on a common theme and wherein each name identifies the network-based information stored at each site;

identifying a user requesting access to one of the sites by a password that is configured to be used for a limited time; and tracking via the sites, a shift of responsibility of making a first decision on a funding request from a first user to a second user, wherein the shift occurs when a second decision is made on the finding request by the first user, and the first decision is made at a level within a business that is separate from other levels within the business at which the second decision is made.

21. A system for facilitating Web-based information exchange, said system comprising:

a device; and a server connected to said device and configured to:

provide a Web-based application including a centralized Web structure for Web-based information of a business the Web structure comprising a plurality of Web sites linked together to form the Web structure; and electronically track, via the Web-based application, actions that include a decision regarding reviewing an idea, and a decision regarding obtaining funding to implement the idea, wherein one of the actions occurs at a level within the business that is separate from any other levels within the business in which remaining of the actions occur.

22. A system in accordance with claim 21 wherein said server further configured to store the Web-based information of the business in the plurality of Web sites in the centralized Web structure.

23. A system in accordance with claim 21 wherein said server further configured to provide sufficient links among the Web sites so that all the Web-based information is accessible from any one location in the Web structure.

24. A system in accordance with claim 23 wherein said server further configured to provide at least one point of entry to the Web structure from which all the Web-based information of the business is accessible.

25. A system in accordance with claim 23 wherein said server further configured to:

provide a plurality of names for the plurality of Web sites, the names chosen to identify the content of each Web site, wherein the names are based on a common theme; and assign a name to each of the plurality of Web sites.

26. A system in accordance with claim 25 wherein said server further configured to:

provide a plurality of location names for the plurality of Web sites, wherein the location names are chosen from real locations in a community; and assign each location name to a Web site so that the location name of each Web site identifies content of the Web site.

27. A system in accordance with claim 26 wherein the Web-based information includes a plurality of data files, said server further configured to store a subset of the plurality of data files at each Web site, the subset of data files at each Web site providing function and content identifiable with the location name of the Web site.

28. A system in accordance with claim 27 wherein said server further configured to:

create a central virtual co-location; and assign a name of a real central administration building to the central virtual co-location.

29. A system in accordance with claim 28 wherein said server further configured to link the plurality of Web sites to the central virtual co-location.

30. A system in accordance with claim 28 wherein said server further configured to link each of the plurality of Web sites at least indirectly to the central virtual co-location.

31. A system in accordance with claim 21 wherein said server further configured to provide Internet access to the Web structure to a plurality of users authorized by the business.

32. A system in accordance with claim 21 wherein said server further configured to provide accessibility to any one Web site from another Web site.

33. A system in accordance with claim 21 wherein said server further configured to:

provide a plurality of sites for containing network-based information on a central server;

link the plurality of sites to one another so that any one of the sites is at least indirectly accessible from any one of the remaining sites; and name each of the plurality of sites on the central server wherein all of the plurality of names are based on a common theme and wherein each name identifies the network-based information stored at each site.

* * * * *

UNITED STATES PATENT AND TRADEMARK OFFICE
CERTIFICATE OF CORRECTION

| | |
|---|---|
| PATENT NO. | : 6,920,495 B1 |
| APPLICATION NO. | : 09/652909 |
| DATED | : July 19, 2005 |
| INVENTOR(S) | : Fuselier et al. |

It is certified that error appears in the above-identified patent and that said Letters Patent is hereby corrected as shown below:

In Claim 1, column 17, beginning on line 1, between "form" and "Web" insert -- the --.
In Claim 14, column 18, line 15, delete "retarding" and insert therefor -- regarding --.
In Claim 16, column 18, line 26, between "of" and "business" insert -- a --.
In Claim 20, column 18, line 59, delete "finding" and insert therefor -- funding --.
In Claim 21, column 19, line 8, delete "idea, and" and insert therefor --idea and --.

Signed and Sealed this

Sixth Day of November, 2007

JON W. DUDAS
*Director of the United States Patent and Trademark Office*